United States Patent
Kingston

(10) Patent No.: US 12,154,439 B2
(45) Date of Patent: Nov. 26, 2024

(54) SYSTEMS AND METHODS FOR GROUND-BASED AUTOMATED FLIGHT MANAGEMENT OF URBAN AIR MOBILITY VEHICLES

(71) Applicant: Honeywell International Inc., Charlotte, NC (US)

(72) Inventor: Kyle Kingston, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 145 days.

(21) Appl. No.: 17/317,648

(22) Filed: May 11, 2021

(65) Prior Publication Data
US 2022/0366794 A1 Nov. 17, 2022

(51) Int. Cl.
*G08G 5/00* (2006.01)
*G08G 5/02* (2006.01)

(52) U.S. Cl.
CPC ........... *G08G 5/003* (2013.01); *G08G 5/0013* (2013.01); *G08G 5/02* (2013.01)

(58) Field of Classification Search
CPC ........ G08G 5/003; G08G 5/0013; G08G 5/02; G08G 5/0026; H04B 7/18506; B64C 19/00
See application file for complete search history.

(56) References Cited

U.S. PATENT DOCUMENTS

| | | | | |
|---|---|---|---|---|
| 7,706,979 B1* | 4/2010 | Herwitz | ............... | G08G 5/0026 701/120 |
| 8,930,044 B1* | 1/2015 | Peeters | ................... | G05D 1/667 709/201 |
| 8,948,935 B1* | 2/2015 | Peeters | .................... | B64D 1/22 709/201 |
| 8,983,682 B1* | 3/2015 | Peeters | ................ | G05D 1/0011 701/2 |

(Continued)

FOREIGN PATENT DOCUMENTS

| | | | |
|---|---|---|---|
| CN | 204760879 U | * | 11/2015 |
| CN | 205608526 U | * | 9/2016 |

(Continued)

OTHER PUBLICATIONS

"Ground Control System for UAS Safe Landing Area Determination (SLAD) in Urban Air Mobility Operations;" Ariante et al.; Sensors (Basel, Switzerland), 22(9), 3226; Apr. 22, 2022. (Year: 2022).*

(Continued)

*Primary Examiner* — Khoi H Tran
*Assistant Examiner* — Jorge O Peche
(74) *Attorney, Agent, or Firm* — Alston & Bird LLP

(57) ABSTRACT

Disclosed are methods, systems, and computer-readable medium for ground-based automated flight management of urban air mobility vehicles. For instance, the method may include: determining whether the ground control system is connected to an UAM vehicle; in response to determining (Continued)

the ground control system is connected to the UAM vehicle, exchanging data with UAM vehicle; automatically and remotely controlling the UAM vehicle using localized temporal data including the data; determining whether further control is necessary; and in response to determining further control is not necessary, releasing the UAM vehicle.

20 Claims, 5 Drawing Sheets

(56) References Cited

U.S. PATENT DOCUMENTS

| | | | | |
|---|---|---|---|---|
| 9,170,117 | B1* | 10/2015 | Abuelsaad | G01C 21/34 |
| 9,307,383 | B1* | 4/2016 | Patrick | B64U 30/299 |
| 9,412,278 | B1* | 8/2016 | Gong | G06F 21/44 |
| 9,488,979 | B1* | 11/2016 | Chambers | G05D 1/0088 |
| 9,489,852 | B1* | 11/2016 | Chambers | G08G 5/0034 |
| 9,501,061 | B2* | 11/2016 | Canoy | G05D 1/0858 |
| 9,626,874 | B1* | 4/2017 | Gupta | G08G 5/0013 |
| 9,933,780 | B2* | 4/2018 | Chau | G05D 1/0088 |
| 9,948,380 | B1* | 4/2018 | Vos | H04B 7/18506 |
| 10,351,239 | B2* | 7/2019 | Di Benedetto | G08G 5/0082 |
| 10,640,208 | B2* | 5/2020 | Gauglitz | G06Q 50/16 |
| 10,836,270 | B2* | 11/2020 | Resnick | B60L 53/36 |
| 10,843,814 | B2* | 11/2020 | Michalski | B64C 39/024 |
| 11,632,698 | B2* | 4/2023 | Hong | H04W 8/24 370/329 |
| 2004/0261043 | A1* | 12/2004 | Baumgartner | G06F 30/3323 716/106 |
| 2010/0302359 | A1* | 12/2010 | Adams | H04L 1/0014 375/240.01 |
| 2011/0084162 | A1* | 4/2011 | Goossen | B64D 1/22 244/135 C |
| 2011/0103293 | A1* | 5/2011 | Gale | H04W 88/10 370/315 |
| 2013/0273839 | A1* | 10/2013 | Breshears | H04L 45/04 455/11.1 |
| 2014/0018979 | A1* | 1/2014 | Goossen | G06Q 10/047 701/3 |
| 2014/0172194 | A1* | 6/2014 | Levien | G08G 5/0069 701/2 |
| 2015/0025797 | A1* | 1/2015 | Hardesty | G01S 19/47 701/469 |
| 2015/0120094 | A1* | 4/2015 | Kimchi | G05D 1/00 701/3 |
| 2015/0158587 | A1* | 6/2015 | Patrick | B64D 1/12 701/3 |
| 2015/0190204 | A1* | 7/2015 | Popovi | A61B 34/10 600/424 |
| 2015/0236778 | A1* | 8/2015 | Jalali | H04B 7/18578 370/316 |
| 2015/0248640 | A1* | 9/2015 | Srinivasan | G05D 1/0676 705/338 |
| 2016/0068264 | A1* | 3/2016 | Ganesh | G06Q 30/0641 701/4 |
| 2016/0111006 | A1* | 4/2016 | Srivastava | G08G 1/00 701/3 |
| 2016/0179096 | A1* | 6/2016 | Bradlow | B64C 27/00 701/8 |
| 2016/0189101 | A1* | 6/2016 | Kantor | G08G 5/0026 705/338 |
| 2016/0225264 | A1* | 8/2016 | Taveira | H04W 48/04 |
| 2016/0253907 | A1* | 9/2016 | Taveira | G08G 5/0039 701/3 |
| 2016/0292696 | A1* | 10/2016 | Gong | G08G 5/0008 |
| 2016/0300496 | A1* | 10/2016 | Cheatham, III | G08G 5/0013 |
| 2016/0330771 | A1* | 11/2016 | Tan | H04B 7/18506 |
| 2016/0358483 | A1* | 12/2016 | Park | G01S 13/91 |
| 2016/0376031 | A1* | 12/2016 | Michalski | G08G 5/0013 701/15 |
| 2017/0045894 | A1* | 2/2017 | Canoy | G08G 5/0013 |
| 2017/0063445 | A1* | 3/2017 | Feria | H04B 7/18504 |
| 2017/0069214 | A1* | 3/2017 | Dupray | H04B 7/18506 |
| 2017/0150373 | A1* | 5/2017 | Brennan | H01Q 1/28 |
| 2017/0154536 | A1* | 6/2017 | Kreiner | G08G 5/0043 |
| 2017/0178518 | A1* | 6/2017 | Foladare | G08G 5/0034 |
| 2017/0208512 | A1* | 7/2017 | Aydin | G05D 1/0022 |
| 2017/0234966 | A1* | 8/2017 | Naguib | G01S 13/86 367/117 |
| 2017/0337827 | A1* | 11/2017 | Chambers | G08G 5/003 |
| 2017/0364065 | A1* | 12/2017 | Petruzzelli | G08G 5/0069 |
| 2018/0004201 | A1* | 1/2018 | Zach | B64U 10/00 |
| 2018/0019516 | A1* | 1/2018 | Teague | H01Q 3/08 |
| 2018/0059239 | A1* | 3/2018 | Batra | H04B 1/38 |
| 2018/0061251 | A1* | 3/2018 | Venkatraman | B64U 10/13 |
| 2018/0086453 | A1* | 3/2018 | Scott-Nash | G08G 5/0021 |
| 2018/0090016 | A1* | 3/2018 | Nishi | G08G 5/0069 |
| 2018/0096611 | A1* | 4/2018 | Kikuchi | G08G 5/045 |
| 2018/0111683 | A1* | 4/2018 | Di Benedetto | G01C 21/20 |
| 2018/0130359 | A1* | 5/2018 | Clark | G08G 5/0013 |
| 2018/0157255 | A1* | 6/2018 | Halverson | G07C 5/0808 |
| 2018/0189516 | A1* | 7/2018 | Browning | G08G 5/0013 |
| 2018/0247544 | A1* | 8/2018 | Mustafic | G08G 5/0034 |
| 2018/0248613 | A1* | 8/2018 | Peitzer | H04B 17/12 |
| 2018/0261112 | A1* | 9/2018 | O'Brien | B64D 1/02 |
| 2018/0276995 | A1* | 9/2018 | Priest | G08G 5/0086 |
| 2018/0292661 | A1* | 10/2018 | Songa | G01C 23/005 |
| 2018/0292844 | A1* | 10/2018 | Kosseifi | G05D 1/0094 |
| 2018/0330624 | A1* | 11/2018 | Gong | H04W 12/122 |
| 2018/0350245 | A1* | 12/2018 | Priest | G08G 5/0039 |
| 2018/0364713 | A1* | 12/2018 | Foster, II | G05D 1/104 |
| 2018/0375568 | A1* | 12/2018 | De Rosa | H04W 72/04 |
| 2019/0019418 | A1* | 1/2019 | Tantardini | G08G 5/0056 |
| 2019/0031346 | A1* | 1/2019 | Yong | G08G 5/0043 |
| 2019/0035285 | A1* | 1/2019 | Priest | G08G 5/0013 |
| 2019/0039729 | A1* | 2/2019 | Alves | G07C 5/085 |
| 2019/0043368 | A1* | 2/2019 | Priest | G08G 5/0069 |
| 2019/0051190 | A1* | 2/2019 | Russell | G05D 1/0027 |
| 2019/0103030 | A1* | 4/2019 | Banga | G08G 5/0082 |
| 2019/0147747 | A1* | 5/2019 | Arngren | H04W 4/029 701/2 |
| 2019/0233102 | A1* | 8/2019 | Kaneichi | G06Q 10/083 |
| 2019/0263521 | A1* | 8/2019 | O'Brien | B64D 1/12 |
| 2019/0268815 | A1* | 8/2019 | Zhu | H04W 36/0033 |
| 2019/0313317 | A1* | 10/2019 | Murphy | H04W 24/02 |
| 2019/0339384 | A1* | 11/2019 | Peng | G08G 5/0069 |
| 2019/0340933 | A1* | 11/2019 | Villa | B64C 29/0016 |
| 2020/0130510 | A1* | 4/2020 | Eck | B60L 53/14 |
| 2020/0143693 | A1* | 5/2020 | Chambers | G08G 5/006 |
| 2020/0158885 | A1* | 5/2020 | Chen | G01S 19/44 |
| 2020/0160730 | A1* | 5/2020 | Priest | B64C 39/024 |
| 2020/0160734 | A1* | 5/2020 | Priest | G08G 5/0069 |
| 2020/0166929 | A1* | 5/2020 | Jiwani | G06V 20/17 |
| 2020/0187072 | A1* | 6/2020 | Hong | H04W 74/0833 |
| 2020/0189736 | A1* | 6/2020 | Gauglitz | G05D 1/0016 |
| 2020/0207474 | A1* | 7/2020 | Foggia | G05D 1/0676 |
| 2020/0209894 | A1* | 7/2020 | Torii | G05D 1/0016 |
| 2020/0219407 | A1* | 7/2020 | Priest | G08G 5/0091 |
| 2020/0226933 | A1* | 7/2020 | Pennisi | G01S 19/00 |
| 2020/0226938 | A1* | 7/2020 | Priest | B64C 27/00 |
| 2020/0231054 | A1* | 7/2020 | Resnick | B60L 53/36 |
| 2020/0234600 | A1* | 7/2020 | Priest | G06V 20/10 |
| 2020/0252941 | A1* | 8/2020 | Schmidt | H04W 72/541 |
| 2020/0344661 | A1* | 10/2020 | Hong | H04W 36/08 |
| 2020/0349852 | A1* | 11/2020 | DiCosola | G06Q 20/20 |
| 2020/0365039 | A1* | 11/2020 | Yamada | G08G 5/0039 |
| 2020/0388172 | A1* | 12/2020 | Wang | G08G 5/0021 |
| 2021/0082291 | A1* | 3/2021 | Villa | G08G 5/0043 |
| 2021/0089134 | A1* | 3/2021 | Tran | G08G 5/0021 |
| 2021/0124376 | A1* | 4/2021 | Edara | B64C 39/024 |
| 2021/0134162 | A1 | 5/2021 | Sundaramurthy et al. | |
| 2021/0144607 | A1* | 5/2021 | Hong | H04W 76/15 |
| 2021/0171197 | A1* | 6/2021 | Anderson | B64U 20/83 |
| 2021/0211185 | A1* | 7/2021 | Hong | G05D 1/0022 |
| 2021/0256855 | A1* | 8/2021 | Hong | H04W 36/0016 |
| 2021/0295711 | A1* | 9/2021 | Hong | H04B 7/18541 |
| 2021/0349456 | A1* | 11/2021 | Pham | B64F 1/36 |
| 2021/0350714 | A1* | 11/2021 | Chambers | G08G 5/003 |
| 2022/0022056 | A1* | 1/2022 | Park | G01S 7/006 |
| 2022/0028280 | A1* | 1/2022 | Kotecha | H04W 12/069 |
| 2022/0065982 | A1* | 3/2022 | Jernbäcker | G08G 1/0112 |

(56) References Cited

U.S. PATENT DOCUMENTS

| | | | | |
|---|---|---|---|---|
| 2022/0083987 A1* | 3/2022 | Bhunia | ................ | B64C 39/024 |
| 2022/0148446 A1* | 5/2022 | Brandao | ............ | G08G 5/0052 |
| 2022/0169401 A1* | 6/2022 | Di Cosola | ................ | B64F 1/32 |
| 2022/0286936 A1* | 9/2022 | Futaki | ................. | H04W 36/08 |
| 2022/0366794 A1* | 11/2022 | Kingston | ............ | G08G 5/0026 |
| 2022/0383755 A1* | 12/2022 | He | ........... | G01S 13/86 |
| 2022/0415187 A1* | 12/2022 | Borgyos | ............. | G08G 5/0091 |
| 2023/0131370 A1* | 4/2023 | Gorski | ................ | A01K 29/005 340/573.1 |
| 2024/0098451 A1* | 3/2024 | Kassas | ................ | H04W 4/024 |

FOREIGN PATENT DOCUMENTS

| | | | | |
|---|---|---|---|---|
| CN | 106385277 A | * | 2/2017 | ............ G08C 17/02 |
| CN | 110971629 A | * | 4/2020 | ............ H04L 67/141 |
| CN | 112859917 A | * | 5/2021 | |
| CN | 113838309 A | * | 12/2021 | ........... G08G 5/0013 |
| CN | 114020020 A | * | 2/2022 | |
| CN | 111435257 B | * | 4/2022 | ........... B64C 39/024 |
| CN | 111899570 B | * | 6/2022 | ........... B64C 39/024 |
| CN | 113247254 B | * | 3/2023 | ........... B64C 39/024 |
| EP | 3757517 A1 | * | 12/2020 | ............ B64D 1/12 |
| EP | 3816970 A1 | | 5/2021 | |
| EP | 3129971 B1 | * | 6/2021 | ........... G08G 5/0013 |
| EP | 3688885 B1 | * | 7/2022 | ........... B64C 39/024 |
| EP | 4027702 A1 | * | 7/2022 | ........ H04W 36/0083 |
| EP | 4089010 A1 | * | 11/2022 | ........... G08G 5/0013 |
| JP | 2015200925 A | * | 11/2015 | |
| JP | 2018511136 A | * | 4/2018 | |
| KR | 20170013450 A | * | 2/2017 | |
| KR | 20170049516 A | * | 5/2017 | |
| KR | 20170127242 A | * | 11/2017 | |
| KR | 101877900 B1 | * | 7/2018 | |
| KR | 20210010719 A | * | 1/2021 | |
| WO | WO-2016153223 A1 | * | 9/2016 | ............ A61B 5/01 |
| WO | WO-2016154551 A1 | * | 9/2016 | ........... B64C 39/024 |
| WO | WO-2016154936 A1 | * | 10/2016 | ........... B64C 39/024 |
| WO | WO-2016154939 A1 | * | 10/2016 | ........... B64C 39/024 |
| WO | WO-2016154942 A1 | * | 10/2016 | ........... B64C 39/024 |
| WO | WO-2016154945 A1 | * | 10/2016 | ........... B64C 39/024 |
| WO | WO-2016154947 A1 | * | 10/2016 | ........... G03B 15/006 |
| WO | 2021/044863 A1 | | 3/2021 | |
| WO | WO-2021075138 A1 | * | 4/2021 | ........... B64C 39/024 |
| WO | WO-2022000245 A1 | * | 1/2022 | |
| WO | WO-2022065876 A1 | * | 3/2022 | ......... H04W 36/249 |
| WO | WO-2023191478 A1 | * | 10/2023 | |

OTHER PUBLICATIONS

"Safe Landing Area Determination (SLAD) for Unmanned Aircraft Systems by using rotary LiDAR;" Ariante et al.; 2021 IEEE 8th International Workshop on Metrology for AeroSpace (MetroAeroSpace) (pp. 110-115); Jun. 23, 2021. (Year: 2021).*

"Security Challenges of Vehicle Recovery for Urban Air Mobility Contexts;" Maxa et al.; 2019 IEEE/AIAA 38th Digital Avionics Systems Conference (DASC) (pp. 1-9); Sep. 1, 2019. (Year: 2019).*

Intention to grant Mailed on Sep. 5, 2023 for EP Application No. 21211353, 8 page(s).

Decision to grant a European patent Mailed on Dec. 21, 2023 for EP Application No. 21211353, 2 page(s).

* cited by examiner

SYSTEMS AND METHODS FOR GROUND-BASED AUTOMATED FLIGHT MANAGEMENT OF URBAN AIR MOBILITY VEHICLES

TECHNICAL FIELD

Various embodiments of the present disclosure relate generally to systems and methods for ground-based automated flight management of urban air mobility vehicles and, more particularly, to systems and methods for ground-based automated flight management of urban air mobility vehicles using localized temporal data.

BACKGROUND

In urban air mobility (UAM) vehicles, UAM vehicles typically have limited payload capacity and energy consumption to travel between destinations. Generally, a plurality of sensors and computers can be placed on the UAM vehicles, although this increases weight and potentially consumes more power. Moreover, a pilot can be used in place of an autonomous system, however, this limits the scale of UAM, since additional pilots require training, and passenger capacity is reduced. Therefore, there may be a challenge to provide UAM vehicles that efficiently use payload capacity and energy consumption.

Furthermore, traditional aircraft (e.g., helicopters) rely on pilots and Air Traffic Controllers to provide separation minimums and landing clearances. The traditional aircraft rely on heavy on-board computers to calculate resolution advisories, determine proximity to the ground and optimized flight plans, or traditional aircraft reduce weight, precision and safety margins by not equipping the aircraft with optional safety equipment like ground proximity warning systems. Therefore, there may be a challenge to provide UAM vehicles that maintain high safety standards and efficient flight planning, without a multitude of on-board systems, which would reduce payload capacity and/or increase energy consumption.

The present disclosure is directed to overcoming one or more of these above-referenced challenges.

SUMMARY OF THE DISCLOSURE

According to certain aspects of the disclosure, systems, methods, and computer-readable medium are disclosed for systems and methods for ground-based automated flight management of urban air mobility vehicles.

For instance, a method may include determining whether the ground control system is connected to an UAM vehicle; in response to determining the ground control system is connected to the UAM vehicle, exchanging data with UAM vehicle; automatically and remotely controlling the UAM vehicle using localized temporal data including the data; determining whether further control is necessary; and in response to determining further control is not necessary, releasing the UAM vehicle.

A system may include at least one memory storing instructions; and at least one processor executing the instructions to perform a process. The process may include determining whether the ground control system is connected to an UAM vehicle; in response to determining the ground control system is connected to the UAM vehicle, exchanging data with UAM vehicle; automatically and remotely controlling the UAM vehicle using localized temporal data including the data; determining whether further control is necessary; and in response to determining further control is not necessary, releasing the UAM vehicle.

A non-transitory computer-readable medium may store instructions that, when executed by a processor, cause the processor to perform a method. The method may include: determining whether the ground control system is connected to an UAM vehicle; in response to determining the ground control system is connected to the UAM vehicle, exchanging data with UAM vehicle; automatically and remotely controlling the UAM vehicle using localized temporal data including the data; determining whether further control is necessary; and in response to determining further control is not necessary, releasing the UAM vehicle.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
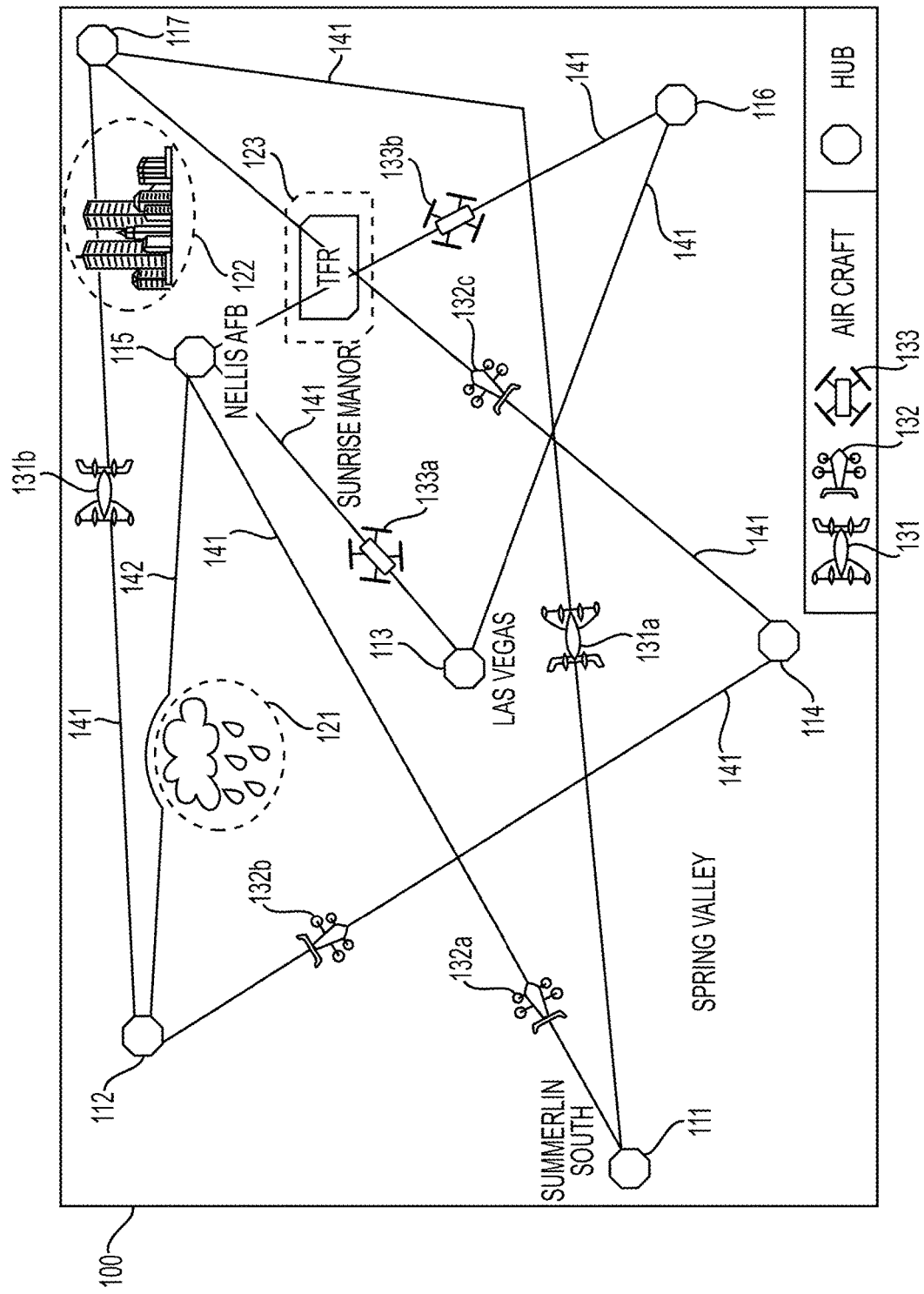
FIG. 1 depicts an example environment in which methods, systems, and other aspects of the present disclosure may be implemented.

Various embodiments of the present disclosure relate generally to systems and methods for ground-based automated flight management of UAM vehicles.

In general, the present disclosure is directed to systems and methods for ground-based automated flight management of UAM vehicles. In particular, a ground control system (or a plurality of ground control systems) may connect with UAM vehicles to autonomously and remotely control the flight controls of the UAM vehicles 310 using localized temporal data. The ground control system may provide instructions regarding a track to follow or provide flight control instructions to directly manage actuation systems of the UAM vehicles (e.g., during a landing procedure). Therefore, UAM vehicles may avoid having additional systems (e.g., ground proximity systems, etc.), thereby increasing payload and/or energy availability, and instead have a minimum control system that handles communication, position and payload sensing, and avionics control for actuation systems. The ground control system may host safety functionality to ensure UAM vehicles maintain safety standards (e.g., resolution advisories, determine proximity) and host planning functionality for optimized flight plans, traffic management, and landing sequencing management (e.g., priority, timing, execution).

For instance, a system of the present disclosure may create a route map (e.g., using a cloud service) for urban areas; create a terrain and building map of the urban areas; equip UAM vehicles with wireless communication devices and on-board sensor suites (e.g., transponder, GPS, pressure sensors on landing gear and/or battery life sensor); equip ground control systems at landing zones (or other locations) with wireless communication devices to transmit and receive data to/from multiple UAM vehicles; using the ground control systems, provide flight planning for the UAM vehicles; and using the ground control systems, transmit instructions (e.g., for flight control instructions) to the UAM vehicles via the wireless communication devices. The ground control systems may continuously update the instructions based on inputs received from UAM vehicles (e.g., from the senor suites), using on-ground ground proximity warning, traffic collision avoidance, and flight management software to optimize a safe route. The UAM vehicles may connect to multiple ground control systems at various landing zones (or other locations) for redundancy, thereby ensuring safety.

Therefore, the ground control system can perform all flight management and separation/avoidance tasks through wireless communication, with minimal weight or power consumption penalties. In particular, using the ground control system may reduce the payload weight and power consumption on the aircraft, thereby providing extended range and/or payload capacity. Moreover, the ground control systems may not be restricted (relative to UAM vehicles) in weight, size and power consumption, so the ground control systems may provide high precision flight information. Furthermore, some software applications may be too resource intensive for UAM vehicles (e.g., physically unable to process the software (ever or in real time) or so intensive as to degrade other software functionalities). In this case, resource intensive software applications may be executed at the ground control systems and provided wirelessly to the UAM vehicles. Additionally, ground control systems may provide scalability, as multiple UAM vehicles may communicate with a single ground control system at a time.

While this disclosure describes the systems and methods with reference to aircraft, it should be appreciated that the present systems and methods are applicable to management of vehicles, including those of drones, automobiles, ships, or any other autonomous and/or Internet-connected vehicle.

As shown in FIG. 1, FIG. 1 depicts an example environment in which methods, systems, and other aspects of the present disclosure may be implemented. The environment of FIG. 1 may include an airspace 100 and one or more hubs 111-117. A hub, such as any one of 111-117, may be a ground facility where aircraft may take off, land, or remain parked (e.g., airport, vertiport, heliport, vertistop, helistop, temporary landing/takeoff facility, or the like). The airspace 100 may accommodate aircraft of various types 131-133 (collectively, "aircraft 131" unless indicated otherwise herein), flying at various altitudes and via various routes 141. An aircraft, such as any one of aircraft 131a-133b, may be any apparatus or vehicle of air transportation capable of traveling between two or more hubs 111-117, such as an airplane, a vertical take-off and landing aircraft (VTOL), a drone, a helicopter, an unmanned aerial vehicle (UAV), a hot-air balloon, a military aircraft, etc. Any one of the aircraft 131a-133b may be connected to one another and/or to one or more of the hubs 111-117, over a communication network, using a vehicle management computer corresponding to each aircraft or each hub. Each vehicle management computer may comprise a computing device and/or a communication device, as described in more detail below in FIG. 3. As shown in FIG. 1, different types of aircraft that share the airspace 100 are illustrated, which are distinguished, by way of example, as model 131 (aircraft 131a and 131b), model 132 (aircraft 132a, 132b, and 132c), and model 133 (aircraft 133a and 133b).

As further shown in FIG. 1, an airspace 100 may have one or more weather constraints 121, spatial restrictions 122 (e.g., buildings), and temporary flight restrictions (TFR) 123. These are exemplary factors that a vehicle management computer of an aircraft may be required to consider and/or analyze in order to derive the most safe and optimal flight trajectory of the aircraft. For example, if a vehicle management computer of an aircraft planning to travel from hub 112 to hub 115 predicts that the aircraft may be affected by an adverse weather condition, such as weather constraint 121, in the airspace, the vehicle management computer may modify a direct path (e.g., the route 141 between hub 112 and hub 115) with a slight curvature away from the weather constraint 121 (e.g., a northward detour) to form a deviated route 142. For instance, the deviated route 142 may ensure that the path and the time of the aircraft (e.g., 4-D coordinates of the flight trajectory) do not intersect any position and time coordinates of the weather constraint 121 (e.g., 4-D coordinates of the weather constraint 121).

As another example, the vehicle management computer of aircraft 131b may predict, prior to take-off, that spatial restriction 122, caused by buildings, would hinder the direct flight path of aircraft 131b flying from hub 112 to hub 117, as depicted in FIG. 1. In response to that prediction, the vehicle management computer of aircraft 131b may generate a 4-D trajectory with a vehicle path that bypasses a 3-dimensional zone (e.g., zone including the location and the altitude) associated with those particular buildings. As yet another example, the vehicle management computer of aircraft 133b may predict, prior to take-off, that TFR 123, as well as some potential 4-D trajectories of another aircraft 132c, would hinder or conflict with the direct flight path of aircraft 133b, as depicted in FIG. 1. In response, the vehicle management computer of aircraft 133b may generate a 4-D trajectory with path and time coordinates that do not intersect either the 4-D coordinates of the TFR 123 or the 4-D trajectory of the other aircraft 132c. In this case, the TFR 123 and collision risk with another aircraft 132c are examples of dynamic factors which may or may not be in effect, depending on the scheduled time of travel, the effective times of TFR, and the path and schedule of the other aircraft 132c. As described in these examples, the 4-D trajectory derivation process, including any modification or re-negotiation, may be completed prior to take-off of the aircraft.

As another example, the vehicle management computer of aircraft 131b may determine to use one of the routes 141 that are set aside for aircraft 131 to use, either exclusively or non-exclusively. The aircraft 131b may generate a 4-D trajectory with a vehicle path that follows one of the routes 141.

As indicated above, FIG. 1 is provided merely as an example environment of an airspace that includes exemplary types of aircraft, hubs, zones, restrictions, and routes. Regarding particular details of the aircraft, hubs, zones, restrictions, and routes, other examples are possible and may differ from what was described with respect to FIG. 1. For example, types of zones and restrictions which may become a factor in trajectory derivation, other than those described above, may include availability of hubs, reserved paths or sky lanes (e.g., routes 141), any ground-originating obstacle which extends out to certain levels of altitudes, any known zones of avoidance (e.g., noise sensitive zones), air transport regulations (e.g., closeness to airports), etc. Any factor that renders the 4-D trajectory to be modified from the direct or the shortest path between two hubs may be considered during the derivation process.

Figure 2:
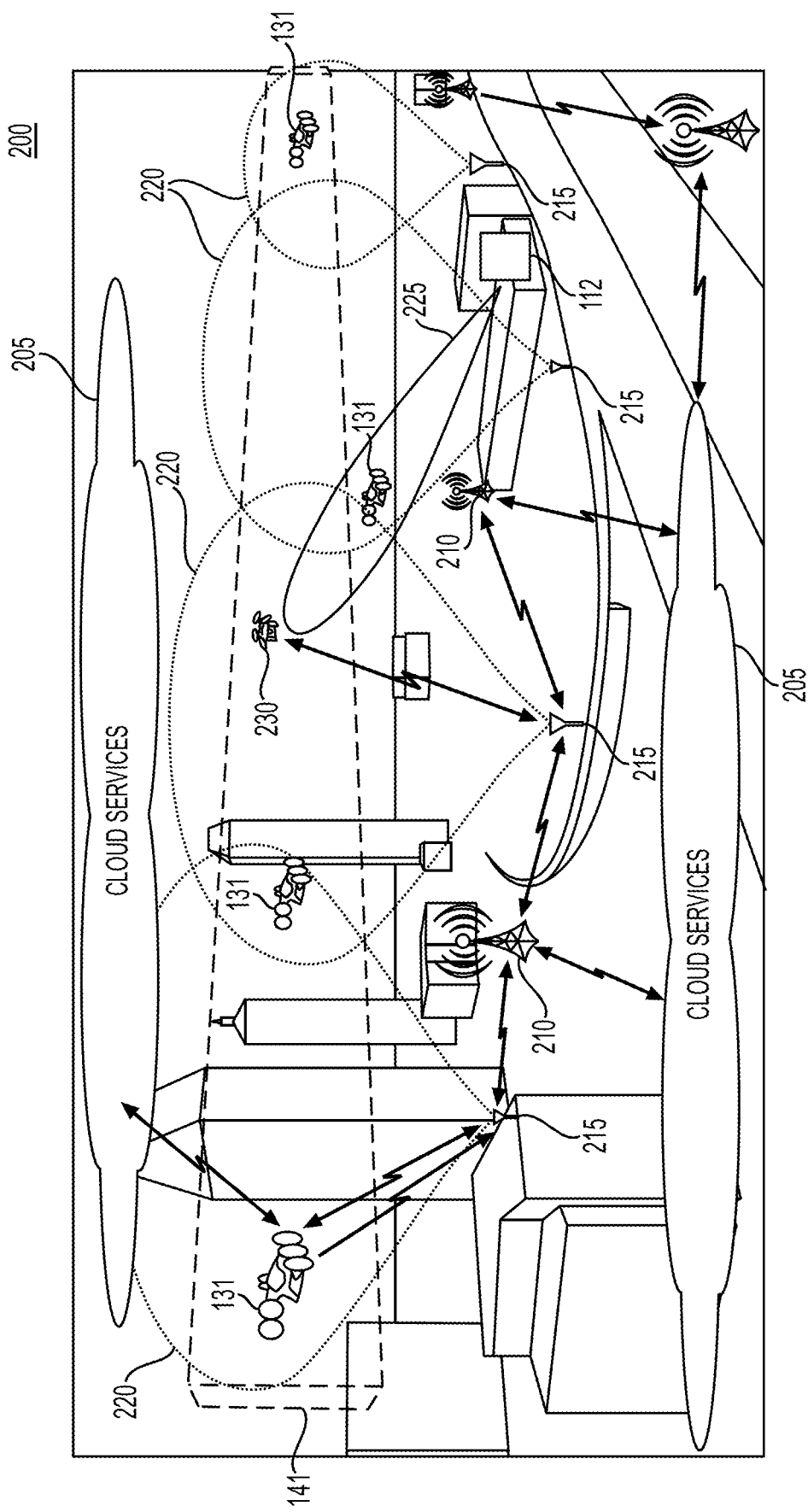
FIG. 2 depicts an exemplary system, according to one or more embodiments.

FIG. 2 depicts an exemplary a system, according to one or more embodiments. The system 200 depicted in FIG. 2 may include one or more aircraft, such as aircraft 131, one or more intruder aircraft 230, a cloud service 205, one or more communications station(s) 210, and/or one or more ground station(s) 215. The one or more aircraft 131 may be traveling from a first hub (e.g., hub 114) to a second hub (e.g., hub 112) along a route of routes 141. Between, near, and/or on hubs, such as hubs 111-117, the one or more ground station(s) 215 may be distributed (e.g., evenly, based on traffic considerations, etc.) along/near/on/under routes 141. Between, near, and/or on hubs, such as hubs 111-117, the one or more communications station(s) 210 may be distributed (e.g., evenly, based on traffic considerations, etc.). Some (or all) of the one or more ground station(s) 215 may be paired with a communication station 210 of the one or more communications station(s) 210.

Each of the one or more ground station(s) 215 may include a transponder system, a radar system, and/or a datalink system.

The radar system of a ground station 215 may include a directional radar system. The directional radar system may be pointed upward (e.g., from ground towards sky) and the directional radar system may transmit a beam 220 to provide three-dimensional coverage over a section of a route 141. The beam 220 may be a narrow beam. The three-dimensional coverage of the beam 220 may be directly above the ground station 215 or at various skewed angles (from a vertical direction). The directional radar system may detect objects, such as aircraft 131, within the three-dimensional coverage of the beam 220. The directional radar system may detect objects by skin detection. In the case of the ground station 215 being positioned on a hub, such as the hub 112, the directional radar system may transmit a beam 225 to provide three-dimensional coverage over the hub 112. The beam 225 may be also be skewed at an angle (from a vertical direction) to detect objects arriving at, descending to, and landing on the hub 112. The beams 220/225 may be controlled either mechanically (by moving the radar system), electronically (e.g., phased arrays), or by software (e.g., digital phased array "DAPA" radars), or any combination thereof.

The transponder system of a ground station 215 may include an ADS-B and/or a Mode S transponder, and/or other transponder system (collectively, interrogator system). The interrogator system may have at least one directional antenna. The directional antenna may target a section of a route 141. For instance, targeting the section of the route 141 may reduce the likelihood of overwhelming the ecosystem (e.g., aircraft 131) with interrogations, as would be the case if the interrogator system used an omnidirectional antenna. The directional antenna may target a specific section of a route 141 by transmitting signals in a same or different beam pattern as the beam 220/225 discussed above for the radar system. The interrogator system may transmit interrogation messages to aircraft, such as aircraft 131, within the section of the route 141. The interrogation messages may include an identifier of the interrogator system and/or request the aircraft, such as aircraft 131, to transmit an identification message. The interrogator system may receive the identification message from the aircraft, such as aircraft 131. The identification message may include an identifier of the aircraft and/or transponder aircraft data (e.g., speed, position, track, etc.) of the aircraft.

If the radar system detects an object and the transponder system does not receive a corresponding identification message from the object (or does receive an identification message, but it is an invalid identification message, e.g., an identifier of un-authorized aircraft), the ground station 215 may determine that the object is an intruder aircraft 230. The ground station 215 may then transmit an intruder alert message to the cloud service 205. If the radar system detects an object and the transponder system receives a corresponding identification message from the object, the ground station 215 may determine the object is a valid aircraft. The ground station 215 may then transmit a valid aircraft message to the cloud service 205. Additionally or alternatively, the ground station 215 may transmit a detection message based on the detection of the object and whether the ground station 215 receives the identification message ("a response message"); therefore, the ground station 215 may not make a determination as to whether the detected object is an intruder aircraft or a valid aircraft, but instead send the detection message to the cloud service 205 for the cloud service 205 to determine whether the detected object is an intruder aircraft or a valid aircraft.

The datalink system of ground station 215 may communicate with at least one of the one or more communications station(s) 210. Each of the one or more communications station(s) 210 may communicate with at least one of the one or more ground station(s) 215 within a region around the communications station 210 to receive and transmit data from/to the one or more ground station(s) 215. Some or none of the communications station(s) 210 may not communicate directly with the ground station(s) 215, but may instead be relays from other communications station(s) 210 that are in direct communication with the ground station(s) 215. For instance, each of the ground station(s) 215 may communicate with a nearest one of the communications station(s) 210 (directly or indirectly). Additionally or alternatively, the ground station(s) 215 may communicate with a communications station 210 that has a best signal to the ground station 215, best bandwidth, etc. The one or more communications station(s) 210 may include a wireless communication system to communicate with the datalink system of ground station(s) 215. The wireless communication system may enable cellular communication, in accordance with, e.g., ITU standards, such as 3G/4G/5G standards. The wireless communication system may enable Wi-Fi communications, Bluetooth communications, or other short range wireless communications. Additionally or alternatively, the one or more communications station(s) 210 may communicate with the one or more of the one or more ground station(s) 215 based on wired communication, such as Ethernet, fiber optic, etc.

For instance, a ground station 215 may transmit an intruder alert message or a valid aircraft message (and/or a detection message) to a communications station 210. The communications station 210 may then relay the intruder alert message or the valid aircraft message (and/or the detection message) to the cloud service 205 (either directly or indirectly through another communications station 210).

The one or more communications station(s) 210 may also communicate with one or more aircraft, such as aircraft 131, to receive and transmit data from/to the one or more aircraft.

For instance, one or more communications station(s) 210 may relay data between the cloud service 205 and a vehicle, such as aircraft 131.

The cloud service 205 may communicate with the one or more communications station(s) 210 and/or directly (e.g., via satellite communications) with aircraft, such as aircraft 131. The cloud service 205 may provide instructions, data, and/or warnings to the aircraft 131. The cloud service 205 may receive acknowledgements from the aircraft 131, aircraft data from the aircraft 131, and/or other information from the aircraft 131. For instance, the cloud service 205 may provide, to the aircraft 131, weather data, traffic data, landing zone data for the hubs, such as hubs 111-117, updated obstacle data, flight plan data, etc. The cloud service 205 may also provide software as a service (SaaS) to aircraft 131 to perform various software functions, such as navigation services, Flight Management System (FMS) services, etc., in accordance with service contracts, API requests from aircraft 131, etc.

Figure 3:
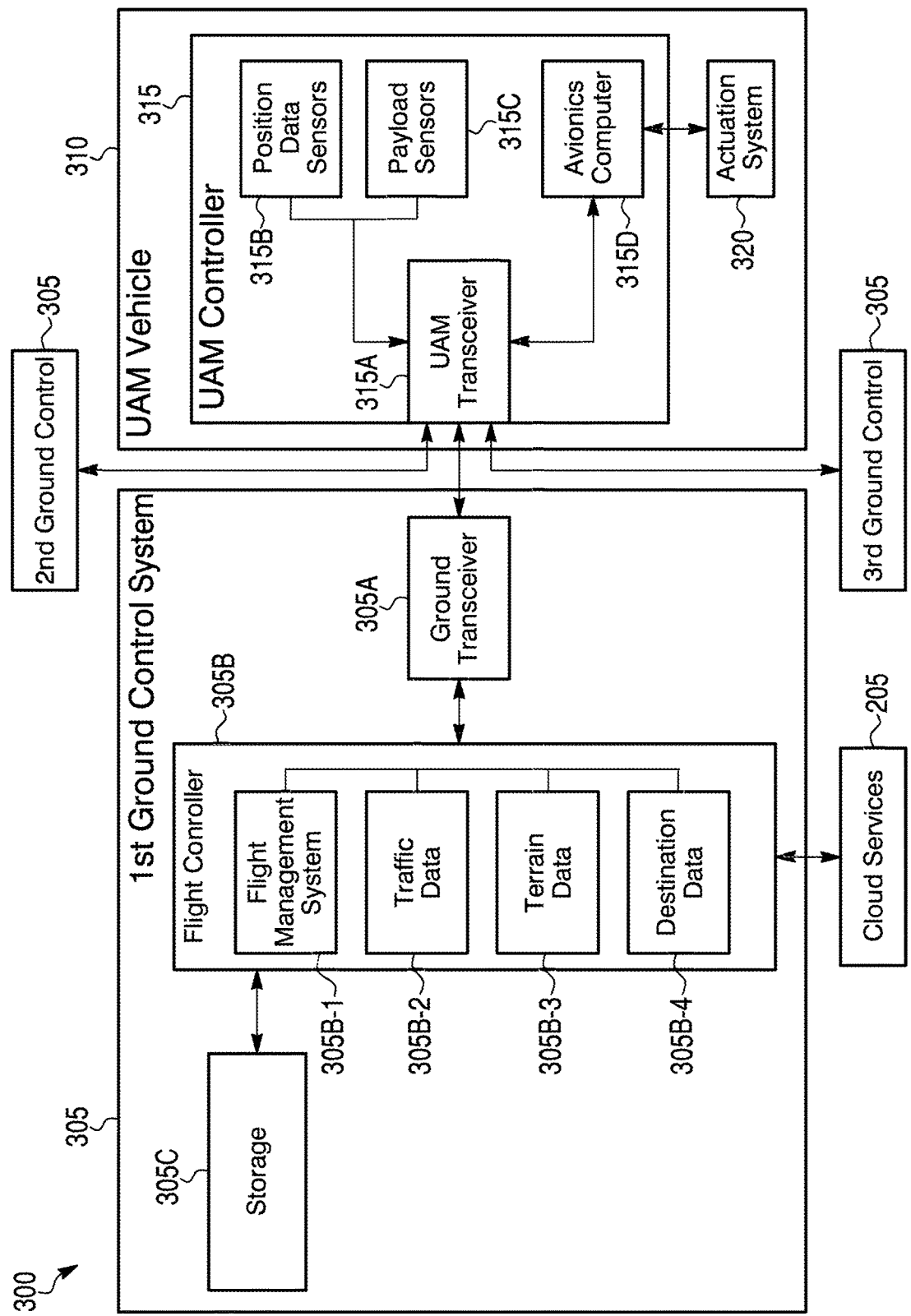
FIG. 3 depicts an exemplary block diagram of a system for ground-based automated flight management of UAM vehicles, according to one or more embodiments.

In one aspect of the disclosure, UAM vehicle(s) 310 (such as one or more of aircraft 131 described above) may be automatically and remotely controlled by ground control systems 305 using localized temporal data. In particular, turning to FIG. 3, FIG. 3 depicts an exemplary block diagram of a system 300 for ground-based automated flight management of UAM vehicles, according to one or more embodiments. The system 300 includes UAM vehicle(s) 310, a plurality of ground control systems 305 (labeled first, second, third, etc.), and the cloud service 205. The UAM vehicle(s) 310 may receive instructions from one or more ground control systems of the plurality of ground control systems 305, while the UAM vehicle(s) 310 take off, transit a route, and land, so that the UAM vehicle(s) 310 may execute flight controls in accordance with the received instructions from the one or more ground control systems of the plurality of ground control systems 305.

Each of the UAM vehicle(s) 310 may include a UAM controller 315 and an actuation system 320. The UAM controller 315 may receive the instructions from one or more ground control systems of the plurality of ground control systems 305 to execute flight controls in accordance with the received instructions. In particular, the UAM controller 315 may send flight control instructions to the actuation system 320 to execute the flight controls. For example, in one aspect of the disclosure, when a UAM vehicle 310 is landing (and flight controls are being directly managed by a ground control system 305), the UAM controller 315 may relay the instructions from the ground control system 305, as flight control instructions, to the actuation system 320. In another aspect of the disclosure, when a UAM vehicle 310 is in transit (and flight controls are being indirectly managed by a ground control system 305), the UAM controller 315 may receive the instructions and generate the flight control instructions based on a current UAM state, to effectuate flight controls in accordance with the received instructions. In this case, the UAM controller 315 may track a route indicated by the instructions using the UAM state to determine flight control instructions to match the route.

The UAM controller 315 may include a UAM transceiver 315A, position data sensors 315B, payload sensors 315C, and an avionics computer 315D. The UAM transceiver 315A may communicate with the ground control systems 305 to send onboard data and receive the instructions. The UAM transceiver 315A may be one or combinations of a Wi-Fi modem, a cellular modem (e.g., 3G, 4G, 5G), a radio transceiver, and/or an optical communication transceiver (e.g., free-space optical communication using lasers) to communicate, directly or indirectly, with ground transceivers 305A (discussed below).

The position data sensors 315B may obtain position data indicating a current position, attitude, altitude, speed, and/or heading, and provide the position data to the UAM transceiver 315A. The position data sensors 315b may include a GPS system, altitude heading reference system, transponders, accelerometers, and/or gyroscopes. The payload sensors 315C may obtain payload data from pressure sensors to detect shifts in (e.g., change in position or orientation of) a payload and/or from pressure sensors to detect weight and/or balance of the UAM vehicle 310. The payload sensors 315C may provide the payload data to the UAM transceiver 315A. Generally, the UAM state includes the position data and/or the payload data. The UAM transceiver 315A may manage and store the UAM state, and report a current UAM state (or for a period of time) to the avionics computer 315D and/or a ground control system 305.

The avionics computer 315D may provide the flight control instructions to the actuation system 320, based on the UAM state and/or the instructions received from a ground control system 305. As mentioned above, the avionics computer 315D may either relay the instructions (as flight control instructions) or generate the flight instructions based on the UAM state and the track indicated by the instructions.

Each of the plurality of ground control systems 305 may include a ground transceiver 305A, a flight controller 305B, and a storage 305C. Each of the plurality of ground control system 305 may be separate from or a part of the one or more communications station(s) 210, and/or one or more ground station(s) 215, so that UAM vehicles 310 may e communicate with a ground control system 305 all of the time, for a majority of a transit, and/or near landing zones. In particular, some ground control systems 305 may be associated with landing zones to manage UAM vehicles 310 during landing and take-off at those landing zones, while other ground control systems 305 may not be associated with landing zones to manage UAM vehicles 310 in transit. As one of skill in the art would recognize, ground control systems 305 may be distributed in different configurations. In FIG. 3, three ground control systems (labeled first, second, third) are depicted, however more or less may be provided. In particular, in the case of a ground control system 305 at a landing zone, it is preferred to have at least three (or only three) ground control systems 305 within a given area (e.g., within a distance to connect to a landing UAM vehicle 310), so that UAM vehicle(s) may have a signal triangulated for precision position and control instructions, as discussed in more detail below.

A ground control system 305 may generate the instructions for a particular UAM vehicle 310 based on localized temporal data. The localized temporal data may include localized environmental data, localized frequency data, and/or landing performance data. "Localized" in this disclosure means data (e.g., environmental data or frequency data) specific to a particular region for a particular location. Each of the localized environmental data, localized frequency data, and/or landing performance data may include current data (e.g., contemporaneous or based on a most recent data acquisition). Therefore, "temporal" in this disclosure means data as sensed contemporaneously with an action taken or based on a most recent data acquisition.

The localized environmental data may include weather data (wind, precipitation, etc.), visibility data, and/or temperature data. The localized environmental data may be collected/sensed by environmental sensors (e.g., weather radar, laser sensors, optical sensors, thermometers, etc.) associated with and near to each ground control system 305. For instance, the ground control system 305 may include the environmental sensors near/adjacent to a landing zone associated with the ground control system 305 or near/adjacent the ground control system 305 (if not associated with a landing zone), and receive the localized environmental data from the environmental sensors, e.g., by wired or wireless communication. The localized environmental data may be used by the ground control system 305 to make localized flight control adjustments based on the localized environmental data (e.g., instantaneous wind readings during descent).

The localized frequency data may include traffic data, landing data, and take-off data. The localized frequency data may be provided by the cloud service 205 and/or tracked and stored locally by a traffic data module 305B-2 (discussed below) for landings at, take-offs from, and traffic near the ground control system 305. For instance, the ground control system 305 may log connections to UAM vehicle(s) 310 (e.g., using WiFi modem router logs); cross-reference the logged connections with actions associated with the UAM vehicle(s) 310 (e.g., if connected but did not land or take-off assign as traffic near, if connected and performed landing task assign as landing at, and if connected and performed take-off task assign as take-off from); and determine the traffic data, the landing data, and the take-off data. For instance, the traffic data, landing data, take-off data may be indexed with respect to time, an average (over a given period, e.g., last ten minutes), or a statistic indicating a frequency of interactions between the ground control system 305 may log connections to UAM vehicle(s). The ground control system 305 may use the traffic data, landing data, and take-off data to schedule and/or prioritize actions for respective UAM vehicle(s) 310.

The landing performance data may include landing zone data and UAM landing data. The landing zone data may include landing data for all or a subset of recent landings at the landing zone associated with the ground control system 305. The ground control system 305 may obtain the landing zone data from the cloud service 205 and/or track and store the landing zone data locally using a destination data module 305B-4, discussed below. The landing data may indicate weights, balance s, landing positions (with respect to a landing zone coordinate) of UAM vehicle(s) 310 that have landed at the landing zone. For instance, the ground control system 305 may have pressure sensors and/or optical sensors to collect and determine the weights, balances, and landing positions. The UAM landing data may include, for a particular UAM vehicle 310, the weight and balance of the particular UAM vehicle 310 at its most recent landing or an average of landings. The particular UAM vehicle 310 may transmit the UAM landing data to the ground control system 305 and/or the cloud service 205, which may relay the UAM landing data to the ground control system 305. As one of skill in the art would recognize, the landing performance data may only be collected/used by or sent to ground control systems 305 that are associated with a landing zone, so that those ground control system 305 may make localized flight control adjustments for the landing zone and the particular UAM vehicle 310.

The ground transceiver 305A may communicate with the UAM vehicle(s) 310 to receive onboard data and send the instructions. The ground transceiver 305A may be one or combinations of a Wi-Fi modem, a cellular base station (e.g., 3G, 4G, 5G), a radio transceiver, and/or an optical communication transceiver (e.g., free-space optical communication using lasers) to communicate, directly or indirectly, with UAM transceivers 315A (discussed above).

The flight controller 305B may generate and send, via the ground transceiver 305A, the instructions to the UAM vehicle(s) 310. For instance, the flight controller 305B may include a flight management system module 305B-1, a traffic data module 305B-2, a terrain data module 305B-3, and a destination data module 305B-4.

The traffic data module 305B-2 may manage the localized frequency data. For instance, the traffic data module 305B-2 obtain the traffic data, landing data, and take-off data from the cloud service 205 and/or tracking the traffic data, landing data, and take-off data locally. The traffic data module 305B-2 may store the localized frequency data in the storage 305C.

The terrain data module 305B-3 may manage map data including route map(s), terrain map(s) and building map(s) localized to a ground control system 305. Each ground control system 305 may store and update its respective map data in the storage 305C, in accordance with updates from the cloud service 205.

The destination data module 305B-4 may manage the localized environmental data and the landing performance data. For instance, the destination data module 305B-4 may obtain, store, and update the weather data, visibility data, and/or temperature data from the cloud service 205 and/or the environmental sensors. The destination data module 305B-4 may obtain, store, and update landing zone data and UAM landing data from the cloud service 205 and/or the pressure sensors and/or optical sensors associated with a landing zone associated with the ground control system 305.

Returning to the flight management system module 305B-1, the flight management system 305B-1 module may manage UAM states for UAM vehicle(s) 310 in the storage 305C. For instance, the flight management system module 305B-1 may obtain, store, and update UAM states from the UAM vehicle(s) 310 and/or the cloud service 205, so that the stored UAM states reflect a current UAM state for each UAM vehicle 310. The flight management system 305B-1 module may obtain, store, and update destination data for the UAM vehicle(s) 310. The destination data may indicate a final location of a transit or a next waypoint after transiting near a respective ground control system 305. For instance, the flight management system 305B-1 module may obtain the destination data from the cloud service 205 (as the cloud service 205 may know a flight plan of a UAM vehicle 310) and/or directly from the UAM vehicle 310. Generally, the flight management system 305B-1 module may manage UAM states/destination data for each UAM vehicle 310, UAM vehicles 310 near (e.g., within a threshold distance) the ground control system 305, UAM vehicles 310 connected to the ground control system 305, or UAM vehicles 310 being managed by ground control system 305

Figure 4:
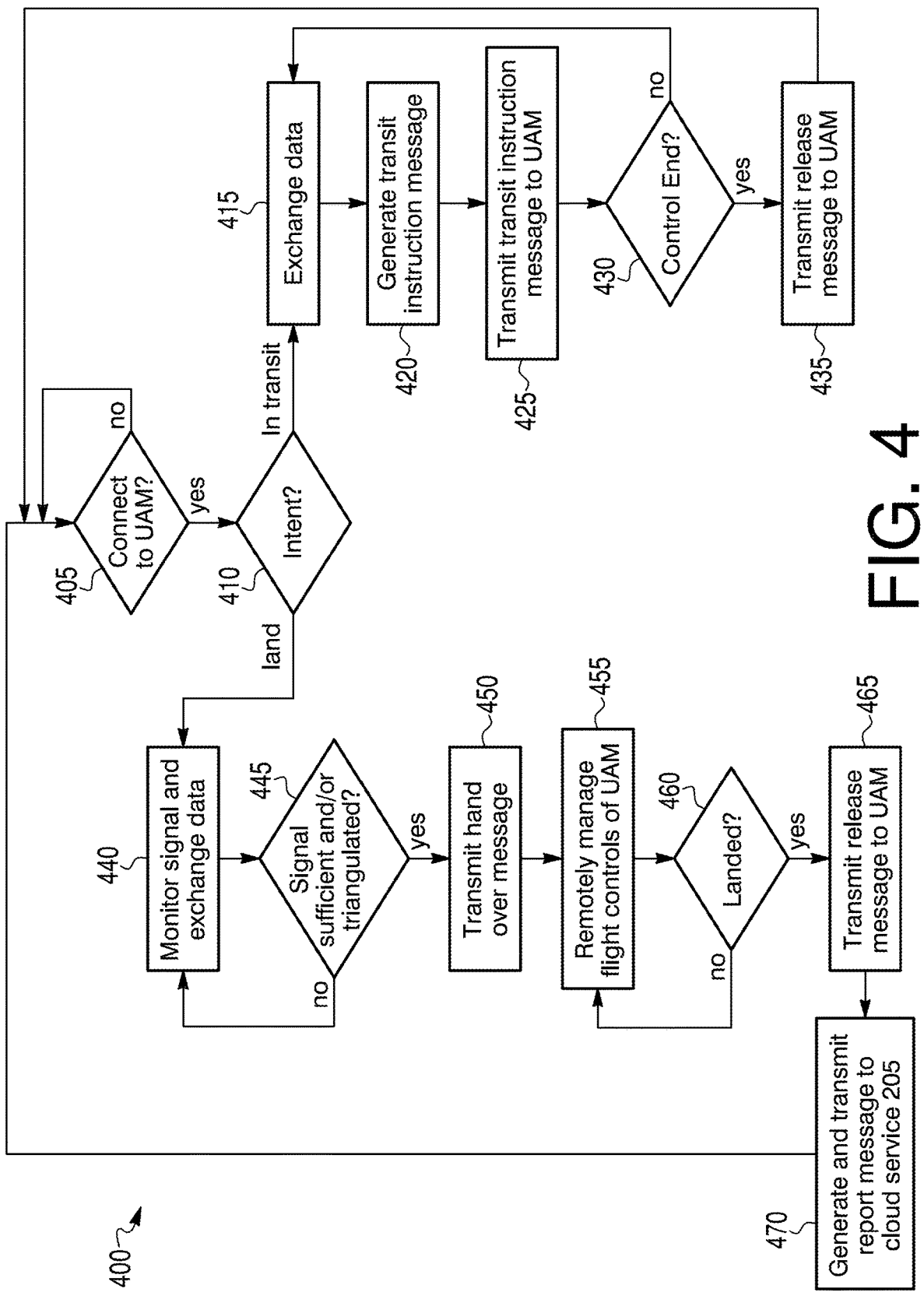
FIG. 4 depicts a flowchart for ground-based automated flight management of UAM vehicles, according to one or more embodiments.

In particular, turning to FIG. 4, FIG. 4 depicts a flowchart 400 for ground-based automated flight management of UAM vehicles, according to one or more embodiments. The flowchart 400 may start by a ground control system 305 determining whether the ground control system 305 is connected to a UAM vehicle 310 (Block 405). For instance, the ground control system 305 may determine the UAM vehicle 310 has connected to a Wi-Fi modem of the ground control system 305. One of skill in the art would recognize that similar determinations can be made in the case the ground transceivers 305A is one of the cellular base station, the radio transceiver, and/or the optical communication transceiver.

In response to determining the ground control system 305 is not connected to a UAM vehicle 310 (Block 405: No), the ground control system 305 may proceed to return to determine whether the ground control system 305 is connected to a UAM vehicle 310 (Block 405). In response to determining the ground control system 305 is connected to a UAM vehicle 310 (Block 405: Yes), the ground control system 305 may proceed to determine an intent of the UAM vehicle 310 (Block 410). For instance, the ground control system 305 may send a pull request requesting the destination data from the UAM vehicle 310 and/or the cloud service 205; determine whether the destination data indicates a landing zone associated with the ground control system 305 is the destination; in response to determining the destination data indicates a landing zone associated with the ground control system 305 is the destination, determine an intent to land; and in response to determining the destination data indicates a landing zone not associated with the ground control system 305 is the destination, determine an intent is to transit.

In response to determining the intent of the UAM vehicle is to transit to another landing zone (Block 410: In Transit), the ground control system 305 may proceed to exchange data with the UAM vehicle 310 (Block 415). For instance, the ground control system 305 may send a pull request requesting destination data (if not requested previously) and/or UAM state from the UAM vehicle 310. The ground control system 305 may proceed to generate a travel instruction message (Block 420). For instance, the ground control system 305 may retrieve relevant data using one or more of the modules discussed above; generate instructions (e.g., a track) for the UAM vehicle 310 to effectuate using the actuation system 320 of the UAM vehicle 310; and package the travel instruction message based on the generated instructions. The ground control system 305 may proceed to transmit the travel instruction message to the UAM vehicle 310 (Block 425).

The ground control system 305 may proceed to determine whether control of the UAM vehicle 310 is ended (Block 430). For instance, the ground control system 305 may determine whether further instructions are necessary for the UAM vehicle 310; if further instructions are necessary, determining control of the UAM vehicle 310 is not ended; and if further instructions are not necessary, determining control of the UAM vehicle 310 is ended. For instance, the ground control system 305 may determine further instructions are necessary for the UAM vehicle 310 if: traffic volume indicated by the traffic data is greater than a threshold, weather is severe (e.g., wind and/or precipitation is greater than a threshold), a landing zone is not operational (e.g., indicated by the ground control system 305 and/or the cloud service 205, such as when a landing zone is under construction, damaged, or temporarily closed while the UAM vehicle 310 is in transit), or the UAM vehicle 310 is more than a threshold distance from a management envelope of the ground control system 305. The management envelope of the ground control system 305 may be a region a connection with a UAM vehicle 310 is stable or a default radius from the ground control system 305.

In response to determining the control of the UAM vehicle 310 is not ended (Block 430: No), the ground control system 305 may proceed to return to exchange data with the UAM vehicle 310 (Block 415). In response to determining the control of the UAM vehicle 310 is ended (Block 430: Yes), the ground control system 305 may proceed to transmit a release message to the UAM vehicle 310 (Block 435). For instance, the release message may indicate the UAM vehicle 310 is to proceed with the track until a next connection with another ground control system 305. One of skill in the art would recognize that handoffs may occur between ground control systems 305, or the UAM vehicle 310 may not be directly managed for segments of travelling a transit.

Returning to Block 410, in response to determining the intent of the UAM vehicle is to land to at this landing zone (Block 410: Land), the ground control system 305 may proceed to monitor a signal for the UAM vehicle 310 and exchange data with the UAM vehicle 310 (Block 440). For instance, the ground control system 305 may send a pull request requesting destination data (if not requested previously) and/or UAM state from the UAM vehicle 310, and the ground control system 305 may send a continuation instruction including instructions to approach a landing zone or to loiter (e.g., in a define pattern or location). To monitor the signal, the ground control system 305 may request signal data from other ground control systems 305. The other ground control systems 305 may be pre-defined (e.g., three ground control systems for a landing zone, as mentioned above) or any ground control systems nearby. The other ground control systems 305 may transmit the signal data, indicating receiver signal strength (RSS), selectivity, and/or positioning data. The RSS and/or selectivity may indicate whether a different ground control system 305 has a better (relative to presently discussed ground control system 305) communication path to the UAM vehicle 310, such that that ground control system 305 should manage a landing of the UAM vehicle 310; if so, a handoff may be coordinated between the two ground control systems 305, as discussed below based on a selection of communication pathways. The positioning data may indicate a range and a relative angle from a ground control system to the UAM vehicle 310 so that the UAM vehicle 310 may be triangulated.

The ground control system 305 may then determine whether the signal is sufficient and/or triangulated (Block 445). For instance, the ground control system 305 may obtain the signal data from the other ground control systems 305 for respective communication pathways between the other ground control systems 305 and the UAM vehicle 310; obtain own-signal data from the UAM transceiver 315A or the ground transceiver 305A for a communication pathway between the ground control system 305 and the UAM vehicle 310; compare the signal data to the own-signal data and a threshold signal; determine whether any of the communication pathways are sufficient (e.g., RSS and/or selectivity are above respective thresholds); in response to none of the communication pathways being sufficient, determine the signal is not sufficient; in response to particular communication pathways being sufficient, determine the signal is sufficient and select a communication pathway and a corresponding ground control system 305 to manage the landing of the UAM vehicle 310. Alternatively or additionally, the ground control system 305 may obtain the signal data from the other ground control systems 305 and the own-signal data; determine a position of the UAM vehicle 310 with a confidence level based on the signal data and own-signal data; determine whether the confidence level of the position is greater than a threshold; in response to determining the confidence level is greater than the threshold, determine the signal is triangulated and select a communication pathway and a corresponding ground control system 305 (e.g., based on a highest RSS and/or selectivity); and in response to determining the confidence level is not greater than the threshold, determine the signal is not triangulated. To select the communication pathway and the corresponding ground control system 305 to manage the landing of the UAM vehicle 310, the ground control system

305 may: have a default order of available ground control systems 310; self-select itself if the own-signal data is greater than selection threshold (and inform the other ground control systems 310); or select/let another of the other ground control systems 305 select itself to manage the landing of the UAM vehicle 310 (and, optionally, inform the other ground control systems 310). In the case another of the other ground control systems 305 is selected to manage the landing of the UAM vehicle 310, the flowchart 400 may end. In the case, the ground control system 305 is selected, the flowchart 400 may continue.

In response to determining the signal is not sufficient and/or triangulated (Block 445: No), the ground control system 305 may then return to determine whether the signal is sufficient and/or triangulated (Block 445). In response to determining the signal is sufficient and/or triangulated (Block 445: Yes), the ground control system 305 may then proceed to transmit a hand over message to the UAM vehicle 310 (Block 450). For instance, the hand over message may indicate that the ground control system 305 is going to remotely manage flight controls of the UAM vehicle 310 by issuing flight control instructions to be relayed to the actuation system 220. In this manner, the ground control system 305 may control the flight of the UAM vehicle 305 using more sensors, data, flight software than is available onboard the UAM vehicle 310.

The ground control system 305 may then proceed to remotely manage flight controls of the UAM vehicle 310 (Block 455). For instance, the ground control system 305 may continuously determine a UAM state of the UAM vehicle (e.g., by receiving data streams from other ground stations 305 including signal data and triangulate a position of the UAM vehicle 310 and/or receiving the UAM state from the UAM vehicle); generate flight control instructions based on the continuous UAM state; and transmit the flight control instructions to the UAM vehicle 310.

The ground control system 305 may then proceed to determine whether the UAM vehicle 310 has landed (Block 460). For instance, the ground control system 305 may determine whether a pressure sensor and/or optical sensors have sensed a touch down on the landing zone, and/or received a message from the UAM vehicle 310 that its pressure sensor sensed a touch down.

In response to determining the UAM vehicle 310 has not landed (Block 460: No), the ground control system 305 may then return to remotely manage flight controls of the UAM vehicle 310 (Block 455). In response to determining the UAM vehicle 310 has landed (Block 460: Yes), the ground control system 305 may then proceed to transmit a release message to the UAM vehicle 310 (Block 465). For instance, the release message may indicate the UAM vehicle 310 is to proceed with powering down and/or preparing for another flight (e.g., a take-off) by recharging, performing safety checks, etc.

The ground control system 305 may then proceed to generate and transmit a report message to the cloud service 205 (Block 470). For instance, the report message may indicate metrics and/or sensor data regarding the landing of the UAM vehicle. The ground control system 305 may then return to determine whether the ground control system 305 is connected to a new UAM vehicle 310 (Block 405).

Figure 5:
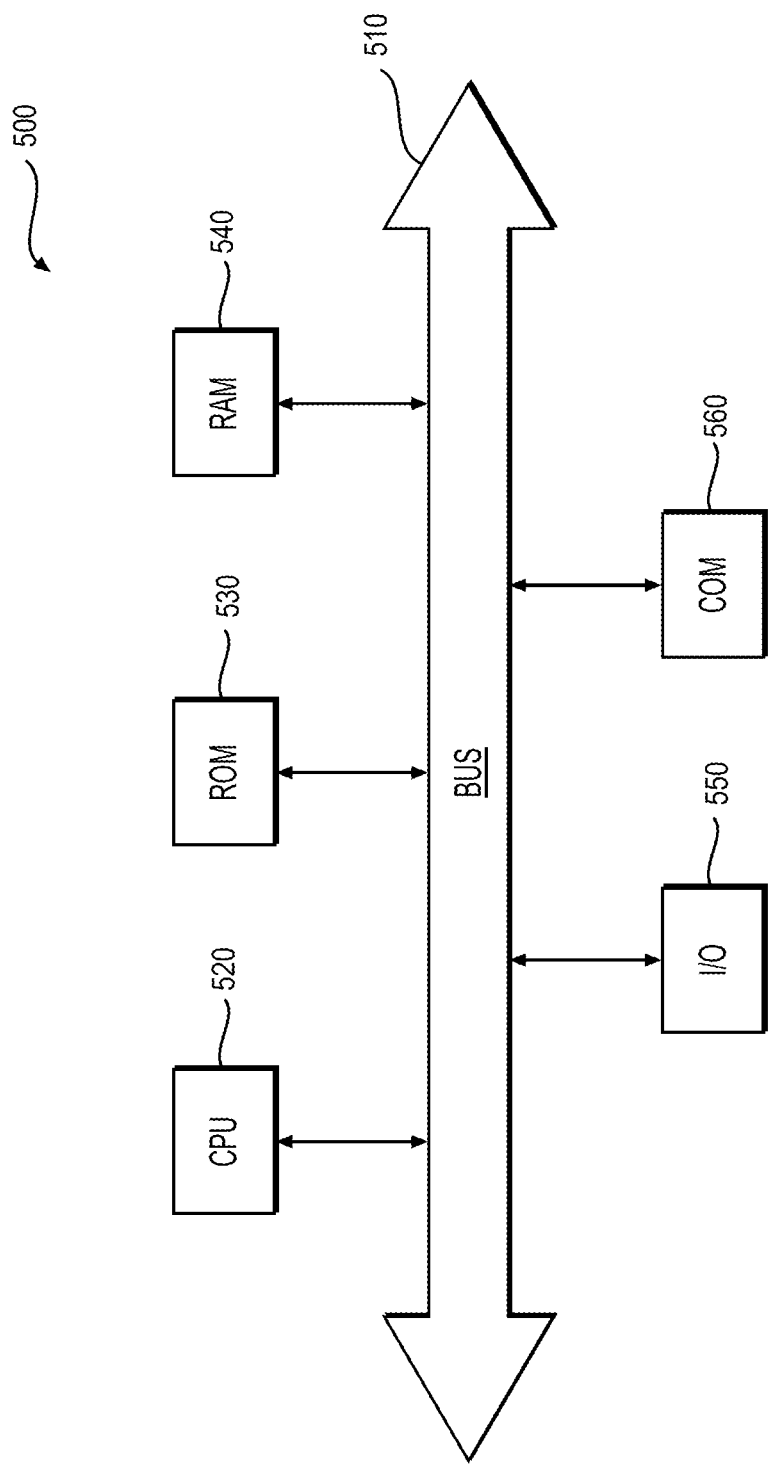
FIG. 5 depicts an example system that may execute techniques presented herein.

FIG. 5 depicts an example system that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for ground-based automated flight management of urban air mobility (UAM) vehicles using a ground control system including a ground-based radar system and a transponder system, the method comprising:
    determining whether a UAM vehicle is connected to a Wi-Fi modem of the ground control system;
    in response to determining the UAM vehicle is connected to the Wi-Fi modem of the ground control system, exchanging data between the ground control system and the UAM vehicle;
    automatically and remotely controlling the UAM vehicle using localized temporal data including the data by:
        sending a pull request requesting destination data from the UAM vehicle, determining whether an intent of the UAM vehicle is to land or to transit based on the destination data from the UAM vehicle;
        in response to determining the intent of the UAM vehicle is to transit, generating and transmitting a transit message to the UAM vehicle, the transit message including instructions for an avionics system of the UAM vehicle to effectuate with an actuation system of the UAM vehicle; and
        in response to determining the intent of the UAM vehicle is to land at a landing zone associated with the ground control system, monitoring a signal and exchanging data and instructions;
    determining whether further control is necessary; and
    in response to determining further control is not necessary, releasing the UAM vehicle.

2. The method of claim 1, wherein the localized temporal data includes localized environmental data, localized frequency data, and/or landing performance data.

3. The method of claim 1, wherein monitoring the signal includes:
    sending pull requests to other ground control systems for signal data;
    determining whether a signal is sufficient and/or triangulated based on the signal data from the other ground control systems and own-signal data obtained by the ground control system; and
    in response to determining the signal is not sufficient and/or triangulated, continuing to monitor the signal and determining whether the signal is sufficient and/or triangulated.

4. The method of claim 3, further comprising:
    in response to determining the signal is sufficient and/or triangulated, transmitting a hand over message to the UAM vehicle; and
    remotely managing flight controls of the UAM vehicle.

5. The method of claim 4, further comprising:
    determining whether the UAM vehicle has landed;
    in response to determining the UAM vehicle has not landed, continuing to remotely manage the flight controls of the UAM vehicle; and
    in response to determining the UAM vehicle has landed, releasing the UAM vehicle by transmitting a release message to the UAM vehicle.

6. The method of claim 1, wherein communication between the ground control system and the UAM vehicle is by Wi-Fi or laser communication.

7. The method of claim 1, wherein in response to determining the intent of the UAM vehicle is to transit, releasing the UAM vehicle by transmitting, via the ground control system, a release message to the UAM vehicle, the release message being defined by an instructional signal configured to instruct the UAM vehicle to continue along a flight path until a connection is established with a second ground control system, wherein a segment of the flight path is within a region having no connection with the Wi-Fi modem of the ground control system and a second Wi-Fi modem of the second ground control system.

8. The method of claim 1, wherein:
the ground control system determines that the intent of the UAM vehicle is to land in an instance in which the destination data indicates a landing zone associated with the ground control system is the destination, and
the ground control system determines that the intent of the UAM vehicle is to transit in an instance in which the destination data indicates a landing zone not associated with the ground control system is the destination.

9. The method of claim 1, further comprising:
in response to determining the intent of the UAM vehicle is to land at a landing zone associated with the ground control system, sending pull requests to other ground control systems for signal data;
determining that one of the other ground control systems has a better communication path to the UAM vehicle than the ground control system; and
handing off management of the landing of the UAM vehicle to the one of the other ground control systems.

10. The method of claim 1, wherein the exchanging data and instructions comprises sending to the UAM vehicle a loiter instruction that includes a defined pattern or location.

11. A system for ground-based automated flight management of urban air mobility vehicles using a ground control system including a ground-based radar system and a transponder system, the system comprising:
at least one memory storing instructions; and
at least one processor configured to execute the instructions to:
determine whether a UAM vehicle is connected to a Wi-Fi modem of the ground control system;
in an instance in which it is determined that the UAM vehicle is connected to the Wi-Fi modem of the ground control system, exchange data between the ground control system and the UAM vehicle;
automatically and remotely control the UAM vehicle using localized temporal data including the data by:
sending a pull request requesting destination data from the UAM vehicle;
determining whether an intent of the UAM vehicle is to land based on the destination data from the UAM vehicle;
determining whether an intent of the UAM vehicle is to transit based on the destination data from the UAM vehicle;
in an instance in which it is determined that the intent of the UAM vehicle is to transit, generate and transmit a transit message to the UAM vehicle, the transit message including instructions for an avionics system of the UAM vehicle to effectuate with an actuation system of the UAM vehicle; and
in an instance in which it is determined that the intent of the UAM vehicle is to land at a landing zone associated with the ground control system, monitor a signal and exchange data and instructions;
determine whether further control is necessary; and
in an instance in which it is determined that further control is not necessary, release the UAM vehicle.

12. The system of claim 11, wherein the localized temporal data includes localized environmental data, localized frequency data, and/or landing performance data.

13. The system of claim 11, wherein the at least one processor is further configured to execute the instructions to:

send pull requests to other ground control systems for signal data;
determine whether a signal is sufficient and/or triangulated based on the signal data from the other ground control systems and own-signal data obtained by the ground control system; and
in an instance in which it is determined that the signal is not sufficient and/or triangulated, continue to monitor the signal and determining whether the signal is sufficient and/or triangulated.

14. The system of claim 13, wherein the at least one processor is further configured to execute the instructions to:
in an instance in which it is determined that the signal is sufficient and/or triangulated, transmit a hand over message to the UAM vehicle; and
remotely manage flight controls of the UAM vehicle.

15. The system of claim 14, wherein the at least one processor is further configured to execute the instructions to:
determine whether the UAM vehicle has landed;
in an instance in which it is determined that the UAM vehicle has not landed, continue to remotely manage the flight controls of the UAM vehicle; and
in an instance in which it is determined that the UAM vehicle has landed, release the UAM vehicle by transmitting a release message to the UAM vehicle.

16. The system of claim 15, wherein communication between the ground control system and the UAM vehicle is by Wi-Fi or laser communication.

17. The system of claim 11, wherein the at least one processor is configured to execute the instructions to automatically and remotely control the UAM vehicle using the localized temporal data including the data by:
in an instance in which it is determined that the intent of the UAM vehicle is to transit, release the UAM vehicle by transmitting, via the ground control system, a release message to the UAM vehicle, the release message being defined by an instructional signal configured to instruct the UAM vehicle to continue along a flight path until a connection is established with a second ground control system, wherein a segment of the flight path is within a region having no connection with the Wi-Fi modem of the ground control system and a second Wi-Fi modem of the second ground control system.

18. The system of claim 11, wherein the at least one processor is configured to execute the instructions to automatically and remotely control the UAM vehicle using the localized temporal data including the data by:
determine that the intent of the UAM vehicle is to land in an instance in which the destination data indicates a landing zone associated with the ground control system is the destination; and
determine that the intent of the UAM vehicle is to transit in an instance in which the destination data indicates a landing zone not associated with the ground control system is the destination.

19. The system of claim 11, wherein the at least one processor is configured to execute the instructions to automatically and remotely control the UAM vehicle using the localized temporal data including the data by:
in an instance in which it is determined that the intent of the UAM vehicle is to land at a landing zone associated with the ground control system:
send pull requests to other ground control systems for signal data;

determine that one of the other ground control systems has a better communication path to the UAM vehicle than the ground control system; and hand off management of the landing of the UAM vehicle to the one of the other ground control systems.

20. A non-transitory computer-readable medium storing instructions that, when executed by a processor, cause the processor to perform a method for ground-based automated flight management of urban air mobility vehicles using a ground control system including a ground-based radar system and a transponder system, the method comprising:

determining whether a UAM vehicle is connected to a Wi-Fi modem of the ground control system;

in response to determining the UAM vehicle is connected to the Wi-Fi modem of the ground control system, exchanging data between the ground control system and the UAM vehicle;

automatically and remotely controlling the UAM vehicle using localized temporal data including the data by:

sending a pull request requesting destination data from the UAM vehicle, and determining whether an intent of the UAM vehicle is to land or to transit based on the destination data from the UAM vehicle;

in response to determining the intent of the UAM vehicle is to transit, generating and transmitting a transit message to the UAM vehicle, the transit message including instructions for an avionics system of the UAM vehicle to effectuate with an actuation system of the UAM vehicle; and in response to determining the intent of the UAM vehicle is to land at a landing zone associated with the ground control system, monitoring a signal and exchanging data and instructions;

determining whether further control is necessary; and in response to determining further control is not necessary, releasing the UAM vehicle.

* * * * *